United States Patent [19]
DiMarco

[11] 3,818,437
[45] June 18, 1974

[54] ANTI-THEFT DEVICE FOR AUTOMOTIVE VEHICLES

[76] Inventor: Carlo DiMarco, 415 Shunk St., Philadelphia, Pa. 19148

[22] Filed: Apr. 2, 1973

[21] Appl. No.: 347,014

[52] U.S. Cl............... 340/65, 340/52 H, 200/61.45
[51] Int. Cl............................................ B60r 25/10
[58] Field of Search.................... 340/52 H, 63, 65; 200/61.45, 61.52

[56] References Cited
UNITED STATES PATENTS

| | | |
|---|---|---|
| 3,671,933 | 6/1972 | Barnes................................. 340/65 |
| 3,715,533 | 2/1973 | Seaton................................. 340/65 |

*Primary Examiner*—Alvin H. Waring
*Attorney, Agent, or Firm*—Seidel, Gonda & Goldhammer

[57] ABSTRACT

An automotive anti-theft device includes a tilt actuable switch mounted on a gimbal. The switch actuates an alarm when the vehicle is tilted from its parked position. The switch aligns with the vertical by rotating on its gimbal mount when the vehicle is parked. The switch is then fixed in position by bringing a solenoid actuator into frictional engagement with a friction surface.

4 Claims, 4 Drawing Figures

ANTI-THEFT DEVICE FOR AUTOMOTIVE VEHICLES

This invention relates to an anti-theft device for automotive vehicles. More particularly, this invention relates to an anti-theft device wherein a tilt actuable switch is readily aligned with the vertical no matter what position the vehicle is parked in and then fixed in that position.

There are various types of known automotive anti-theft devices. Some, by way of example, actuate an alarm when one of the closures on an automotive vehicle is unauthorizedly opened. Other automotive anti-theft devices disable the vehicle so that it cannot be started or otherwise moved under its own power except by setting a code. Still others combine the aforesaid methods of preventing automotive theft. The difficulty with these approaches is that they are ineffectual against the type of theft where the vehicle is physically hauled away by a tow truck without prior entry or an attempt to start and drive it away. The present anti-theft device for automotive vehicles is directed toward preventing this latter type of theft.

Devices for preventing automotive theft by sensing when the vehicle has been tilted have been proposed for preventing theft by hauling away the vehicle. Such devices, most often, use a tilt actuable switch wherein a volume of mercury either makes or breaks a circuit to actuate an alarm. The difficulty with these prior devices is that they work only when the vehicle is parked on the level. Unfortunately, the vehicles are most often not parked on the level. Rather, they tend to be parked with a tilt in almost any direction. As a result, such prior art anti-theft devices such as disclosed in U.S. Pat. No. 3,603,562 lack sufficient universality to be readily incorporated into a vehicle for use at any time.

The present invention overcomes the foregoing disadvantages of tilt actuable switches by mounting such switch in a gimbal fixed within the vehicle. The switch contains a mass which causes it to at all times align itself with the vertical at which position the alarm is not actuated. Upon assuming that position, the switch can be locked in position by causing a solenoid to engage a friction surface. Once so locked in position, the alarm will be actuated should any attempt be made to move the vehicle by physically hauling it away since such movement must necessarily tilt the vehicle. Thus, the present invention provides a form of universality for such tilt actuable switches which heretofore have not been present in anti-theft devices for automotive vehicles.

For the purpose of illustrating the invention, there is shown in the drawings a form which is presently preferred; it being understood, however, that this invention is not limited to the precise arrangements and instrumentalities shown.

Figure 1:
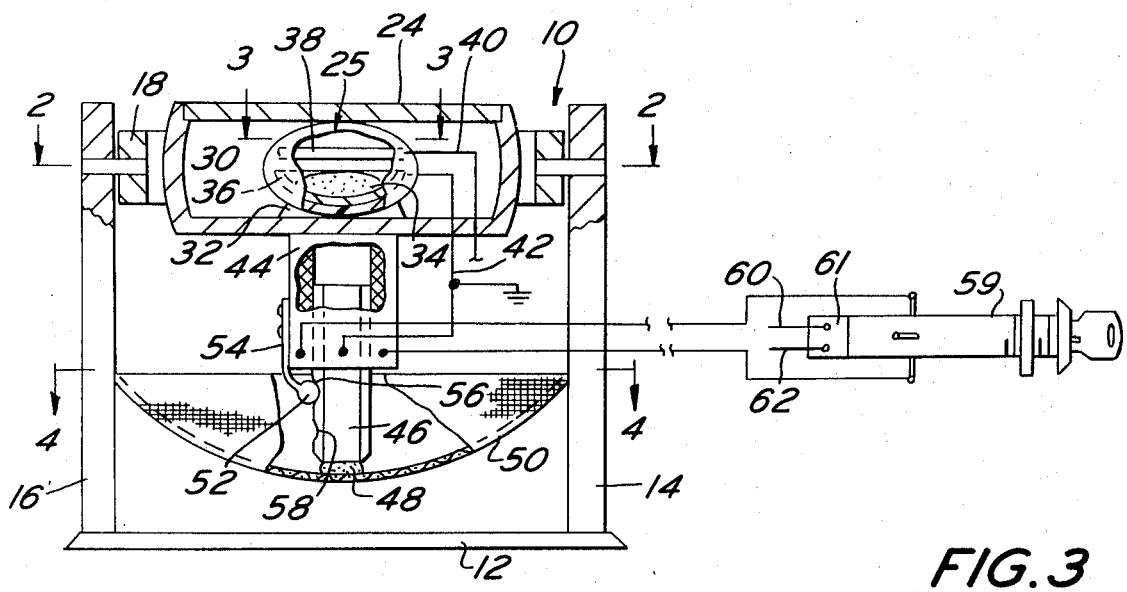
FIG. 1 is a side elevational view, partially in section, showing the anti-theft device of the present invention.
Figure 3:
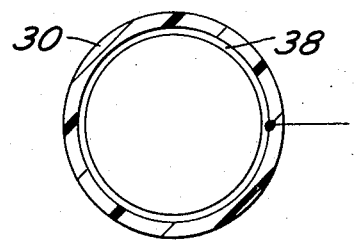
FIG. 3 is a partial sectional view showing the tilt actuable switch taken along the line 3—3 in FIG. 1.
Figure 2:
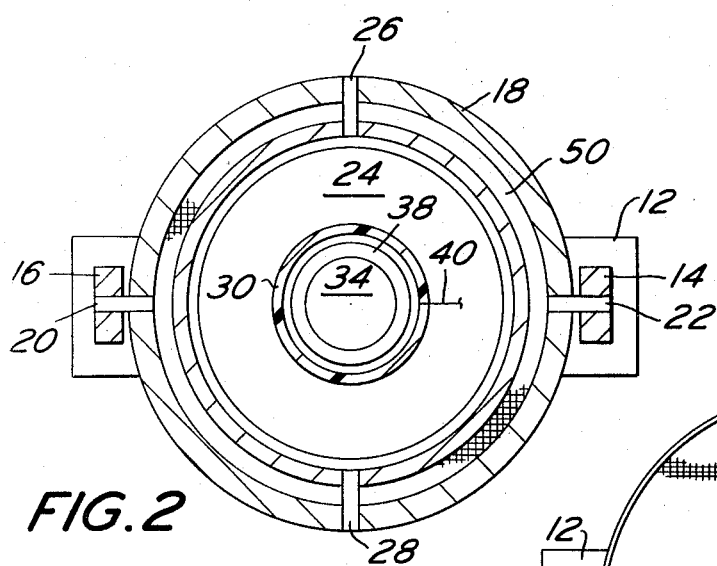
FIG. 2 is a sectional view of the anti-theft device taken along the line 2—2 in FIG. 1.
Figure 4:
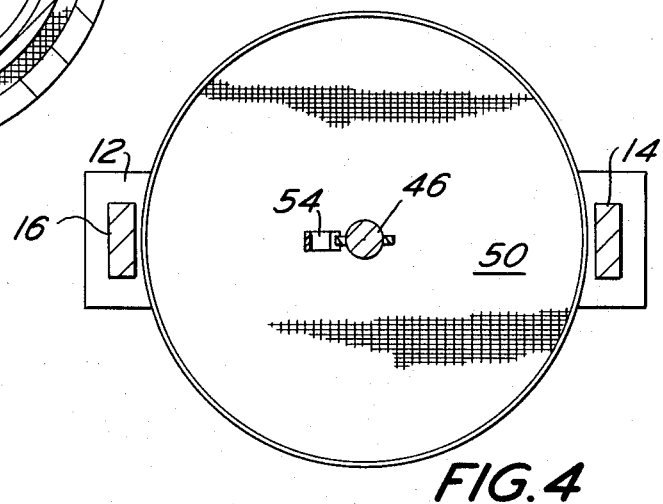
FIG. 4 is a sectional view taken along the line 4—4 in FIG. 1.

Referring now to the drawing in detail, wherein like numerals indicate like elements, there is shown in FIG. 1 an anti-theft device for automotive vehicles designated generally as 10. The apparatus 10 is normally enclosed within a housing which is not shown. The base 12 of the apparatus supports a pair of uprights 14 and 16 upon which is mounted a gimbal ring 18 by means of the pivot pins 20 and 22. A housing 24 is mounted on pivot pins 26 and 28 within the gimbal ring 18. Fixed within the housing 24 is a tilt actuable switch 25 comprising a capsule 30 preferably made of plastic or some other insulating material. The capsule 30 is fixed to the housing 24 by means of an adhesive 32 and contains within its interior a volume of mercury 34. The volume of mercury 34 rests within a cup-shaped electrode 36 fixed within the capsule 30. The volume of mercury is sized such that it does not make contact with the ring electrode 38 whenever an imaginary line drawn through the capsule 30 normal to the ring electrode is aligned with the vertical. However, the mercury will make contact with both the cup electrode 36 and the ring electrode 38 whenever the capsule 30 is tilted so that the aforesaid imaginary line is no longer aligned with the vertical. In actual practice, it is preferable that the mercury make contact with both electrodes 36 and 38 whenever the tilt of the capsule 30 from the vertical exceeds 5°. However, those skilled in the art may wish to make other adjustments depending upon the degree of sensitivity sought for the device 10.

Appropriate conductors 40 and 42 are connected to the ring electrode 38 and cup electrode 36, respectively, so that the volume of mercury 34 will make or break the circuit to which said conductors are connected.

The switch 25 has been mounted on a gimbal so that it at all times properly aligns itself with the vertical. This alignment with the vertical is accomplished by affixing a dependent mass from the housing 24. This mass provides the housing 24 and hence the entire tilt actuable switch mechanism 25 with a center of gravity below the gimbal pivot pins and according to the natural laws of gravitational physics always aligns itself with the vertical. While the mass may be artificially created such as by a lead weight, the present invention uses a solenoid for this purpose so as to combine two functions in one structure. Aside from providing the mass, the solenoid 44 also serves to fix the tilt actuable switch in position once it has been aligned with the vertical, regardless of how the vehicle is tilted. As shown, the solenoid 44 includes an actuator 46 reciprocable within the solenoid. Actuator 46 is provided with a rubber tip 48 or some other form of roughened surface which has a relatively high index of friction. Upon actuation of the solenoid, the actuator 46 is extended out of the solenoid and engages the dish-shaped friction surface 50. Dish-shaped friction surface 50 may be a piece of metal or a wire screen or the like affixed to the uprights 14 and 16. The solenoid 44 is affixed to the bottom surface of the housing 24 so that the capsule 30 contained therein and hence the tilt actuable switch 25 comprising the electrodes 36 and 38 as well as the volume of mercury 34 are aligned with the vertical as described above. When still aligned, the actuator 46 will overlie a particular area of the friction surface 50, depending upon the particular orientation of the vehicle and hence the base 12 and uprights 14 and 16. At this point, the solenoid 44 can be energized causing the actuator 46 to extend outwardly and engage the friction surface. A ball 52 is mounted at the end of a spring 54 and is normally biased against the actuator 46. In the extended position, the ball 52 rests in the detent 56 and hence maintains the tip 48 of actuator 46 in engagement with the friction surface 50, thus fixing the tilt actuable switch in alignment with the vertical. To free the housing 24 and hence the tilt actuable switch, the solenoid 44 is energized so as to retract the actuator 46 and is held in that retracted position by the ball 52 resting in the detent 58.

The solenoid 44 is controlled by means of a key actuated switch 59, preferably mounted in the dashboard of the automotive vehicle or some other convenient place. As shown, the switch is connected to the appropriate terminals of the solenoid 44 and depending upon which way the switch is turned, controls the direction of movement of the actuator 46 within the solenoid. The key actuated switch 59 also includes a switch 61 which controls the energization of an alarm circuit. The appropriate alarm, such as a siren, is not shown. However, it is connected in circuit with the switch 61 through the conductors 60 and 62 as well as being in circuit with the conductors 40 and 42 extending from the tilt actuable switch. When the switch 61 opens the circuit, the alarm cannot be energized regardless of the position of the volume of mercury 34 within the tilt actuable switch. However, when switch 61 is closed, the actuation of the alarm is under the control of the tilt actuable switch and the alarm will be energized if the mercury 34 closes the switch by making contact between the electrodes 36 and 38.

It should be apparent from the foregoing, that there has been provided an anti-theft device which permits an automotive vehicle to be parked at any position and still be operative to detect when the vehicle has been unauthorizably tilted such as when an attempt is made to haul it away.

The present invention may be embodied in other specific forms without departing from the spirit or essential attributes thereof and, accordingly, reference should be made to the appended claims, rather than to the foregoing specification as indicating the scope of the invention.

I claim:

1. Anti-theft apparatus for automotive vehicles, comprising:
    a tilt actuable switch operatively in circuit with an alarm so that said alarm may be actuated when a vehicle in which said switch is mounted is tilted relative to its parked position;
    said tilt actuable switch being mounted on a gimbal, said gimbal being adapted to be fixed to the vehicle;
    a mass fixed to said gimbal mounted switch so that said switch self-aligns with the vertical, said switch being operative to actuate said alarm only when it is tilted off the vertical;
    a solenoid having an actuator extendable therefrom upon actuation of said solenoid;
    a friction surface positioned in opposed relation to said actuator;
    one of said solenoid and said friction surface being fixed in position and the other being displaceable with the tilt actuable switch so that said actuator may frictionally engage different areas of said friction surface depending upon the position of said switch relative to its gimbal mount; and
    means to cause said actuator to extend into engagement with said surface when said vehicle is parked.

2. An anti-theft apparatus for automotive vehicles in accordance with claim 1 wherein said solenoid is said mass.

3. An anti-theft apparatus for automotive vehicles in accordance with claim 2 wherein said solenoid is mounted to said switch and said friction surface is a curved surface fixed in opposed relation to the solenoid actuator.

4. An anti-theft apparatus for an automotive vehicle in accordance with claim 3 wherein said tilt actuable switch comprises a capsule, said capsule encapsulating a volume of mercury, an electrical contact within said capsule in constant contact with said mercury, and an annular contact positioned above said mercury to be contacted by said mercury only when said switch is tilted off the vertical.

* * * * *